(12) United States Patent
Steingraeber

(10) Patent No.: US 6,594,555 B2
(45) Date of Patent: Jul. 15, 2003

(54) METHOD FOR STEAM TURBINE HALFSHELL ALIGNMENT

(75) Inventor: Daniel Leonard Steingraeber, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 336 days.

(21) Appl. No.: 09/740,962

(22) Filed: Dec. 21, 2000

(65) Prior Publication Data

US 2002/0082726 A1 Jun. 27, 2002

(51) Int. Cl.$^7$ ................................................. G01M 1/38
(52) U.S. Cl. ........................ 700/279; 700/280; 702/150
(58) Field of Search .......................... 700/90, 275, 279, 700/280; 33/504; 702/150

(56) References Cited

U.S. PATENT DOCUMENTS

| | | |
|---|---|---|
| 3,783,522 A | 1/1974 | Dodd |
| 5,056,237 A | 10/1991 | Saunders |
| 5,526,282 A | 6/1996 | Nower et al. |
| 5,627,761 A | 5/1997 | Pollard |
| 5,684,578 A | 11/1997 | Nower et al. |

Primary Examiner—Jayprakash N. Gandhi
(74) Attorney, Agent, or Firm—Banner & Witcoff, Ltd.

(57) ABSTRACT

A method for predicting an amount of distortion experienced by turbine components due to the replacement of an upper turbine portion, such as an upper casing, is disclosed. In an exemplary embodiment, a horizontal plane is defined by reference to support points for the turbine casing or shell. From this plane, the relative elevations of support points for a component being aligned is measured, as are elevations along the turbine lower casing at the same axial location as the component. From these relative elevations, vertical and/or transverse offset values are calculated using a predictive algorithm. These offset values may then be used to adjust the aligned component to compensate for the predicted amount of vertical and/or transverse displacement that occurs when the upper casing(s) is/are replaced.

13 Claims, 10 Drawing Sheets

METHOD FOR STEAM TURBINE HALFSHELL ALIGNMENT

BACKGROUND OF THE INVENTION

One or more embodiments of the present invention relate generally to the field of steam turbines. In particular, embodiments of the present invention relate to the servicing of such turbines, such as the disassembly, reassembly, and alignment of components as a turbine is serviced.

Steam turbines are typically constructed using one or more removable upper portions (e.g., upper shells or casings) to allow access to components within the generator itself. The components within the turbine may include a large number of stationary and rotating components. Rotating components may include one or more wheels, shafts, bearings, etc. that rotate during the operation of the turbine. Stationary components may include one or more stationary wheels, diaphragms, support pads, deflectors, etc. that remain stationary during operation of the turbine. Turbines may also include one or more lower portions (e.g., lower shells or casings) that generally serve as a support for the other turbine components, and may also assist in sealing the steam path to prevent leakage.

Close tolerances among the various components of a turbine directly affect its efficiency. To illustrate, a large steam turbine weighing several tons may have tolerances for internal components measured in millimeters (mm), or in thousandths of an inch (mils). If stationary and rotating components are too close to one another, rubbing between the components may occur during operation. This rubbing makes it difficult to start the turbine after a servicing or overhaul, and generates excessive vibration. The rubbing also wears away the seals between the rotating and stationary components, and after the components have worn themselves free, excessive clearance will then exist in the areas in which rubbing occurred.

If stationary and rotating components are too far apart from another, steam leakage may occur between the components, reducing the efficiency of the turbine. Accordingly, great care is desirable when servicing or maintaining a turbine to ensure that the various components are aligned and positioned correctly.

During an offline servicing or overhaul of a turbine, various components of a turbine may be accessed by removing the upper casing or casings, commonly referred to as "tops". With the tops off, stationary and rotating components of the turbine may be inspected, adjusted, cleaned, repaired, replaced, and/or otherwise serviced. One type of inspection may determine the amount of displacement suffered by various components due to turbine operation. For example, certain stationary components might have shifted in alignment. Components that have become misaligned may then be realigned as a part of this inspection. Upon completion of the servicing or overhaul, the upper casings may be replaced, and the turbine returned to operation.

Unfortunately, an alignment problem commonly occurs when the tops are placed back on the turbine. The upper casings may weigh one ton or more, and the placement of these upper casings onto the turbine may cause an additional amount of displacement or distortion among the previously-aligned components. Such displacement may generally be referred to herein as tops on displacement. For example, a lower casing might bow or sag between support points when in the tops off condition, and one or more stationary components connected to the lower casing may shift as well. If the components are aligned with the tops off, they may shift when the tops are placed back on, and may actually shift out of alignment.

To address this problem, it is conventional to conduct a tops on/tops off alignment procedure. In this procedure, the upper casings are first removed and the various components are serviced and/or aligned as needed. After these components are serviced, the upper casings are replaced, and the various components are measured for position both vertically and transversely with respect to the centerline of the unit. Then, the upper casings are once again removed, and a tops off line is measured. The tops off line measures the transverse and vertical positions of the internal components with the upper casings and/or components removed. Then, these measurements are compared to determine an ideal line for the internal components when in the tops off condition.

Then, with the upper casings removed, the components are then adjusted to account for the tops on displacement. When the tops are placed back on, the components are then expected to shift into alignment. For example, a set of tops on and tops off measurements might show that a particular component shifts upwards 10 mils when the tops are placed on. This component may be aligned, in the tops off condition, to be 10 mils low to account for this rise.

The tops on/tops off procedure described above helps to ensure that various turbine components are in optimal alignment at the completion of the servicing. However, the tops on/tops off procedure is time consuming. Many hours are required to perform the various measurements, as well as removing and replacing the upper casings, resulting in higher costs for personnel time and a greater amount of lost revenue due to the turbine being offline. Consequently, there is a need for a turbine servicing procedure that can reduce the time needed to align various components of a turbine.

BRIEF SUMMARY OF THE INVENTION

One or more embodiments of the present invention help to reduce the time needed to align turbine components, and will be summarized below. Briefly, in one embodiment, a series of measurements are taken to determine a relative displacement exhibited by various components in their tops off state. With these measurements, a predictive algorithm is employed to determine one or more predicted offset values to compensate for the tops on displacement. The various components may then be adjusted, while the turbine remains in a tops off state, to account for the anticipated tops on displacement. When the tops are then replaced, the components may displace themselves into alignment, reducing the need for a separate series of tops on measurement, removal of tops, and realignment of components.

In a further embodiment, a topographical distortion map may be generated using a reference plane through one or more support points located on a lower casing or shell. From this plane, the vertical displacements at one or more points in the turbine may be measured, and from these displacements, predictions of vertical and/or transverse displacements may be calculated. These predictions may then be used to adjust one or more components in the tops off condition to account for displacement occurring when going to the tops on condition.

These and other embodiments and features are described in greater detail with reference to the attached drawings and the descriptions appearing below.

BRIEF DESCRIPTION OF THE DRAWINGS

Throughout this application, like numbers are used to designate like features between the figures.

DETAILED DESCRIPTION OF THE INVENTION

Figure 1:
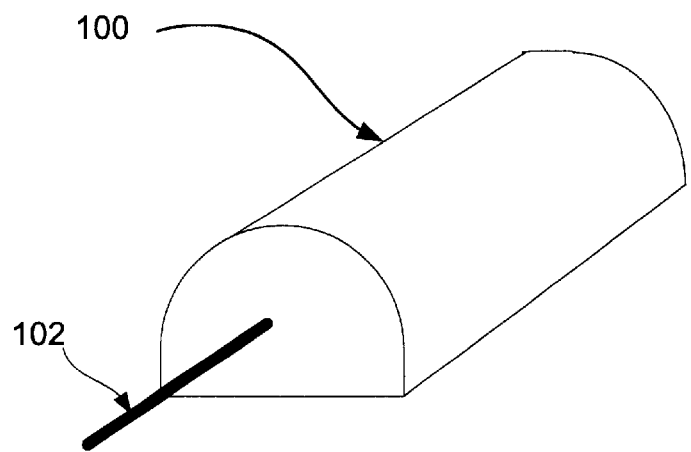
FIG. 1 shows an exemplary simplified conventional turbine.

FIG. 1 shows a simplified external diagram of an intact turbine 100. Shaft 102 is shown to run the length of turbine 100, and may generally be coupled to a load (not shown) driven by the turbine 100 during operation. Such a load may be, for example, and electrical generator. The load end is commonly referred to as the generator end of the turbine, while the opposite end is commonly referred to as the turbine end of the turbine.

Figure 2:
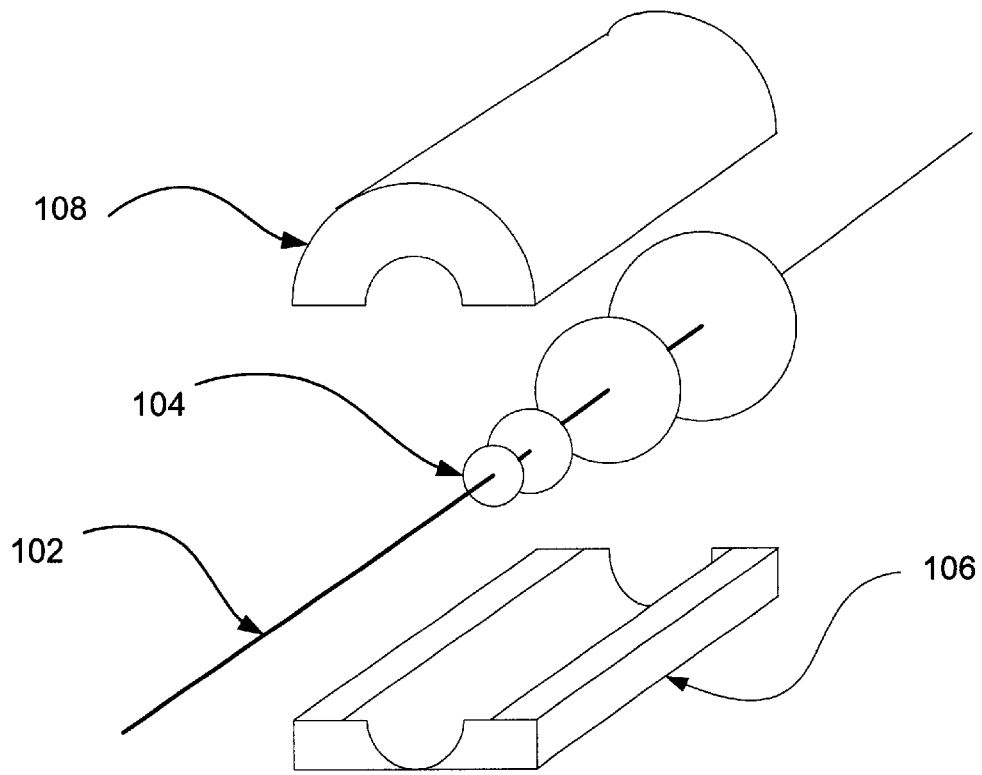
FIG. 2 shows an exploded view of the simplified conventional turbine depicted in FIG. 1.

FIG. 2 depicts the FIG. 1 turbine 100 in a simplified exploded view. As seen in FIG. 2, turbine 100 may include a plurality of wheels 104 attached to shaft 102. These wheels 104 may include a plurality of radially-arranged air foils, commonly referred to as blades or buckets (not shown), which capture kinetic energy from steam as it passes through the steam path of the turbine. Turbine 100 may also include a plurality of diaphragms (not shown), which are stationary counterparts to the wheels that may also have a plurality of blades or buckets. Together, as is understood in the art, the various compartments formed by the air foils of the wheels and the diaphragms allow the wheels to capture kinetic energy from steam as it expands and travels through the turbine 100.

Turbine 100 may be encased using two or more separate pieces that assemble to seal in the wheels, diaphragms, and steam during operation. In the exemplary FIG. 2 embodiment, the turbine 100 is comprised of a lower casing 106 and upper casing 108. Typically, lower casing 106 is stationary, and various components of turbine 100 may be mounted to and/or rest on lower casing 106. Alternatively, lower casing 106 may include one or more moving parts. Upper casing 108 may be removable to allow access to the various components within the turbine. The surface or seam at which the upper casings and lower casings come together may commonly be referred to as a horizontal joint.

Figure 3:
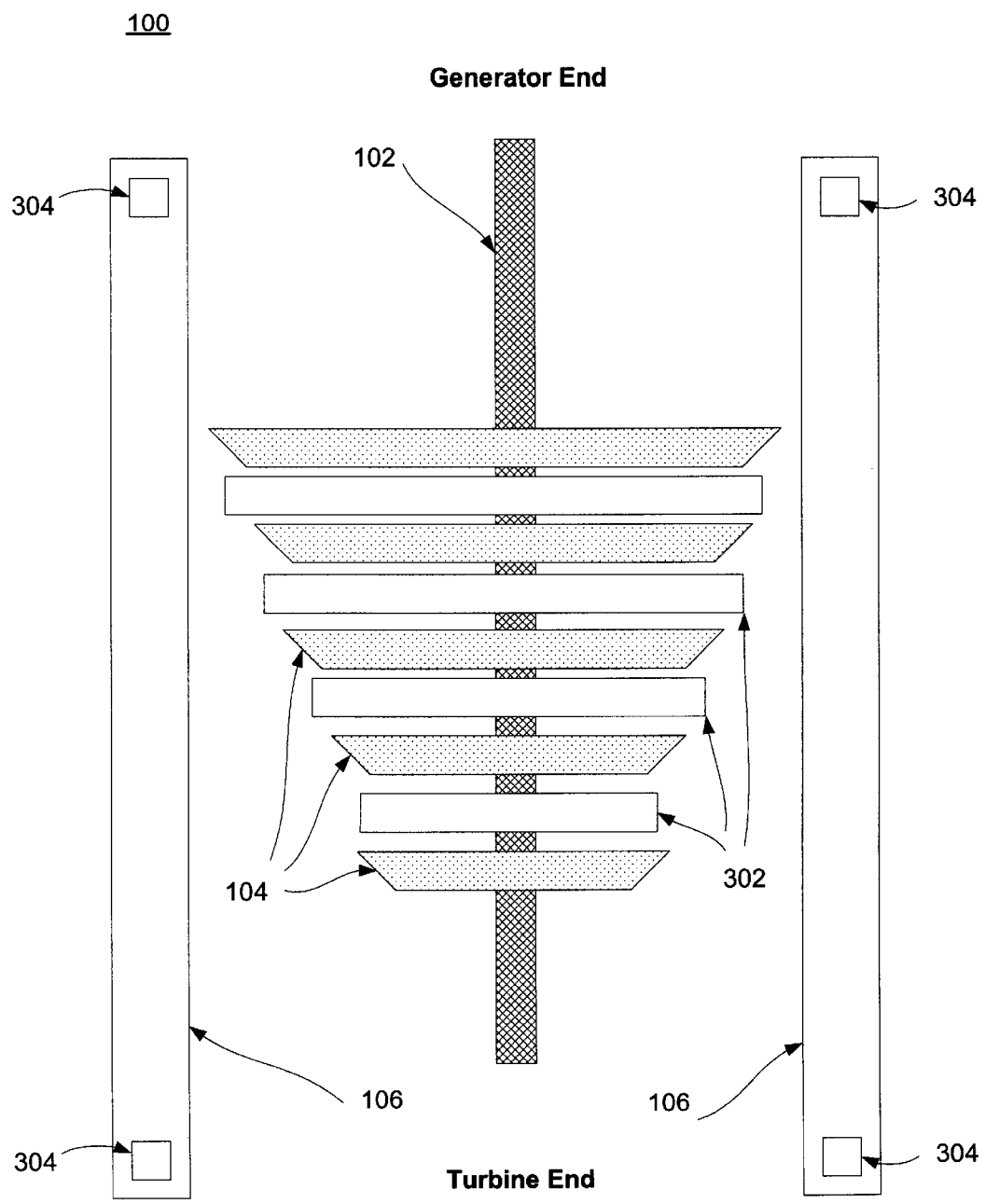
FIG. 3 shows an overhead view of the FIG. 1 turbine with the upper casing removed.

FIG. 3 depicts a simplified overhead view of turbine 100 in its tops off condition. As noted above, turbine 100 may include a plurality of diaphragms 302 having air foils (not shown) as counterparts to the various wheels 104. The diaphragms 302 may each be mounted onto the lower casing 106 at one or more diaphragm support points (not shown) located along the turbine. The support points for each diaphragm are generally located near its ends, may be symmetrically located about the axis of the shaft 102, and may be referred to as forming diaphragm pockets. Lower casing 106 may also include one or more support points 304. Lower casing support points 304 provide stationary points and support upon which turbine 100 rests. In the exemplary turbine 100, four support points 304 are shown, but other turbines may have greater or fewer numbers of support points.

Figure 4:
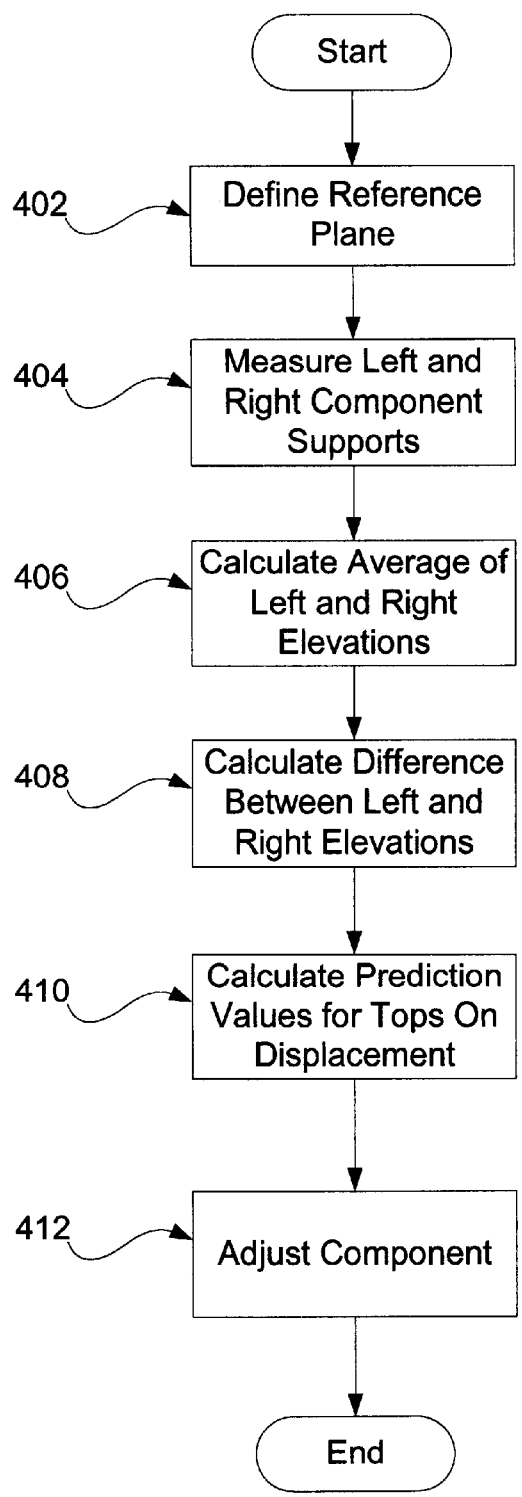
FIG. 4 is a flow diagram depicting steps taken in an exemplary embodiment of the present invention.

FIG. 4 is a flow diagram depicting an exemplary embodiment of the present invention by which tops on displacements of various components within turbine 100 may be predicted with the tops off. Such a prediction may reduce the amount of time needed to realign turbine components, and may eliminate significant portions of the conventional tops off/tops on alignment process.

Figure 5:
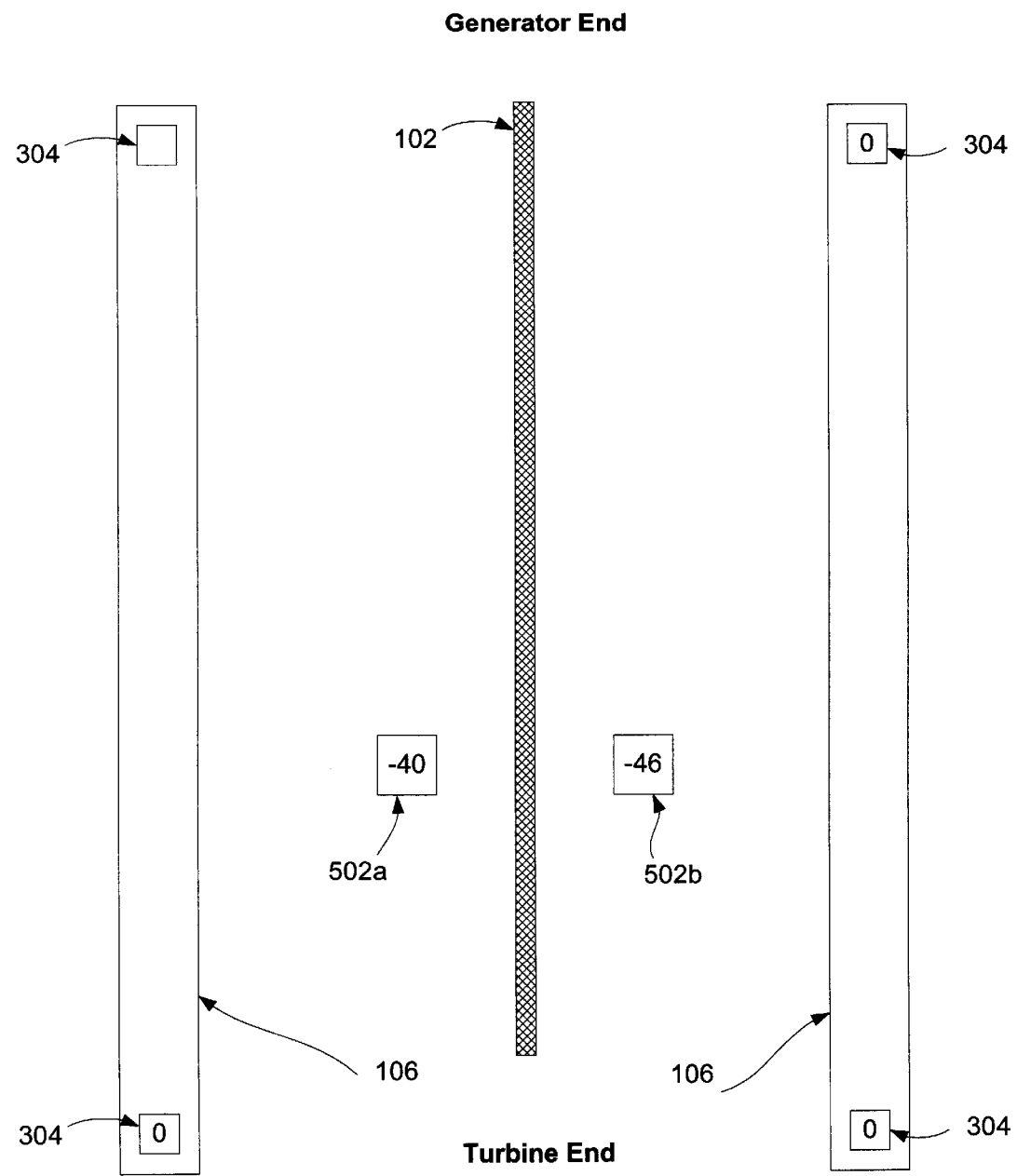
FIG. 5 is a topographical map showing relative elevations of points in the FIG. 3 turbine.

In the FIG. 4 process, relative vertical displacements exhibited by various points throughout the turbine 100 may be measured to generate a topographical map showing such vertical displacements. FIG. 5 is an exemplary topographical map of the exemplary FIG. 3 overhead view of turbine 100, and may be generated through the steps of FIG. 4, which will be described below. The FIG. 5 topographical map retains lower casing 106, with four lower casing support points 304, and shaft 102, but omits the diaphragms and wheels for clarity in explanation.

Referring to the FIG. 4 process, the alignment of the diaphragm closest to the turbine end will be described. However, it will be understood that the same process disclosed herein may be used to align other components, stages, and/or diaphragms of turbine 100 as well. In step 402, a reference plane may be established through any three support points 304 after the upper casing 108 has been removed. The reference plane may be used to measure the relative displacements exhibited at other points throughout the turbine, and it will be understood that other forms of measurement, with any frame of reference, may be used as well. In preferred embodiments, the reference plane may be defined with the use of one or more laser devices. Similarly, the various measurements described herein may be taken using laser devices, or any other known method for measuring distances.

The reference plane may be defined to have an elevation of zero (0), and this numeral appears in the FIG. 5 topographical map. In the FIG. 5 example, the reference plane is defined using the left and right turbine end supports, and the right side generator end support. On the FIG. 5 map, the elevation at these support points is indicated with a zero (0). The elevation for the fourth support point 304 is not needed, but may also be measured.

In step 404, the relative elevation of the left and right supports for the component being aligned is then measured. In the FIG. 5 map, the left and right supports for the diaphragm (or other component, stage, etc.) being aligned are represented as points 502a and 502b, respectively. The elevation may be measured using any known means, and may be achieved through the use of one or more lasers. Once measured, the elevations may be entered onto the map. In the FIG. 5 example, the left component support point 502a is shown having a relative elevation of −40 units, which means the support point 502a is 40 units lower than the reference plane. The topographical map and/or relative elevation measurements may be accomplished using any unit of measurement, and for simplicity, these units will simply be referred to herein as "units". It will be understood, however, that these units may be expressed in other forms, such as mils, millimeters, inches, centimeters, etc. The right component support point 502b is shown having an elevation of −46 units, or 46 units below the reference plane.

In step 406, the average is taken between the left and right elevations for the component support points 502a and 502b. In the FIG. 5 example, this average is −43 units, or (½)((−40)+(−46)). In step 408, the difference between the left and right elevations for component support points 502a and 502b is calculated. In the FIG. 5 example, the difference is 6 units, with the right support 502b being lower than the left.

In step 410, an adjustment algorithm is applied to the figures calculated in steps 406 and 408 to arrive at prediction offset values to compensate for tops on displacement for the component supports 502a,b. This algorithm was discovered by the inventor through an analysis of sampling data taken from numerous tops on/tops off service and alignment processes, and has been tested through extensive regression analysis.

In the adjustment algorithm of this exemplary preferred embodiment, a single prediction is determined for both component support points 502a,b. This single prediction may include, however, both a vertical displacement prediction, and a transverse displacement prediction (perpendicular to the axis of the shaft 102). Alternative embodiments might calculate and use just one of these prediction offset values.

According to the algorithm, the offset needed to compensate for vertical tops on displacement may be predicted to be one-third of the average determined in step 406. In the FIG. 5 example, this prediction value would be one-third of −43 units, or −14.333 units. An offset prediction value less than zero indicates that the component support points 502a,b (and components mounted thereon) are expected to rise (or increase elevation) by the prediction value, and that the component needs to be lowered by the prediction value to compensate. In the FIG. 5 example, the support points 502a and 502b are predicted to rise by 14.333 units.

According to a further aspect of the algorithm, prediction offset values for the transverse (or left-right, in FIG. 5) tops on displacement may also be determined. This transverse offset is predicted to be one-half of the absolute value of the difference calculated in step 408. In the FIG. 5 example, the predicted tops on transverse displacement is one-half of 6 units, or 3 units. In the transverse calculation, the direction of the offset for the transverse displacement is predicted to be in the direction of the lesser of the two component support 502a,b elevations measured in step 404. In the FIG. 5 example, the left side component support 502a elevation is greater (at −40 units, as compared to −46 units for the right side 502b), and as such, the component supports 502a,b are predicted to require a transverse offset of 3 units to the right (toward the lesser elevation) to compensate for tops on transverse displacement.

In step 412, the calculated prediction offset values may then be used to adjust the components to account for the predicted displacements, improving their alignment when the upper casing is replaced. In the FIG. 5 example, component supports 502a,b are predicted to rise by 14.333 units, and shift to the left by 3 units, upon replacement of the turbine's upper casing. To compensate for this, the component supports 502a,b may be adjusted in step 412 to be lowered by 14.333 units, and shifted to the right by 3 units, such that upon replacement of the turbine upper casings, the component supports 502a,b may be predicted to displace into alignment.

Figure 6:
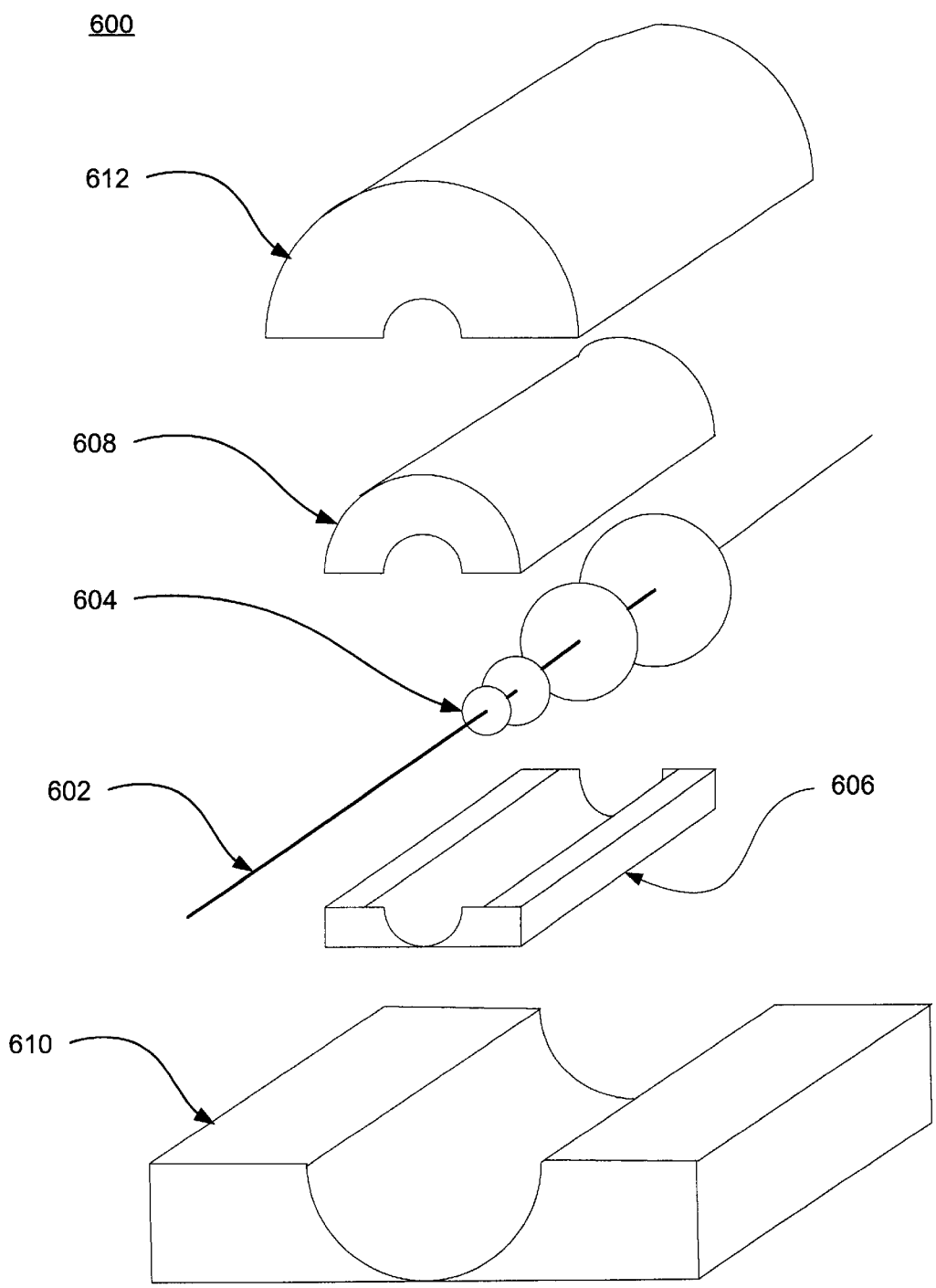
FIG. 6 is an exploded view of a conventional steam turbine having an inner and outer shell, each with an upper and lower casing.

FIG. 6 shows another exemplary turbine 600 in which embodiments of the present invention may be applied. In turbine 600, the shaft 602 and wheels 604 are similar to those described with respect to turbine 100. Turbine 600 may also include lower and upper casings 606 and 608, respectively, that combine to form an inner shell. This inner shell may be similar to the single shell described above with respect to turbine 100, and may help seal the steam pressure around the rotating shaft 602. Alternatively, the inner shell may differ from the turbine 100 shell. The FIG. 6 turbine 600 may also include an outer shell formed by an outer shell lower casing 610, and outer shell upper casing 612. The outer shell may form an additional sealing pressure vessel for the steam within the turbine, help route exhaust, and perform other functions known to those in the art, and may include a number of outer shell support points (not shown).

Figure 7:
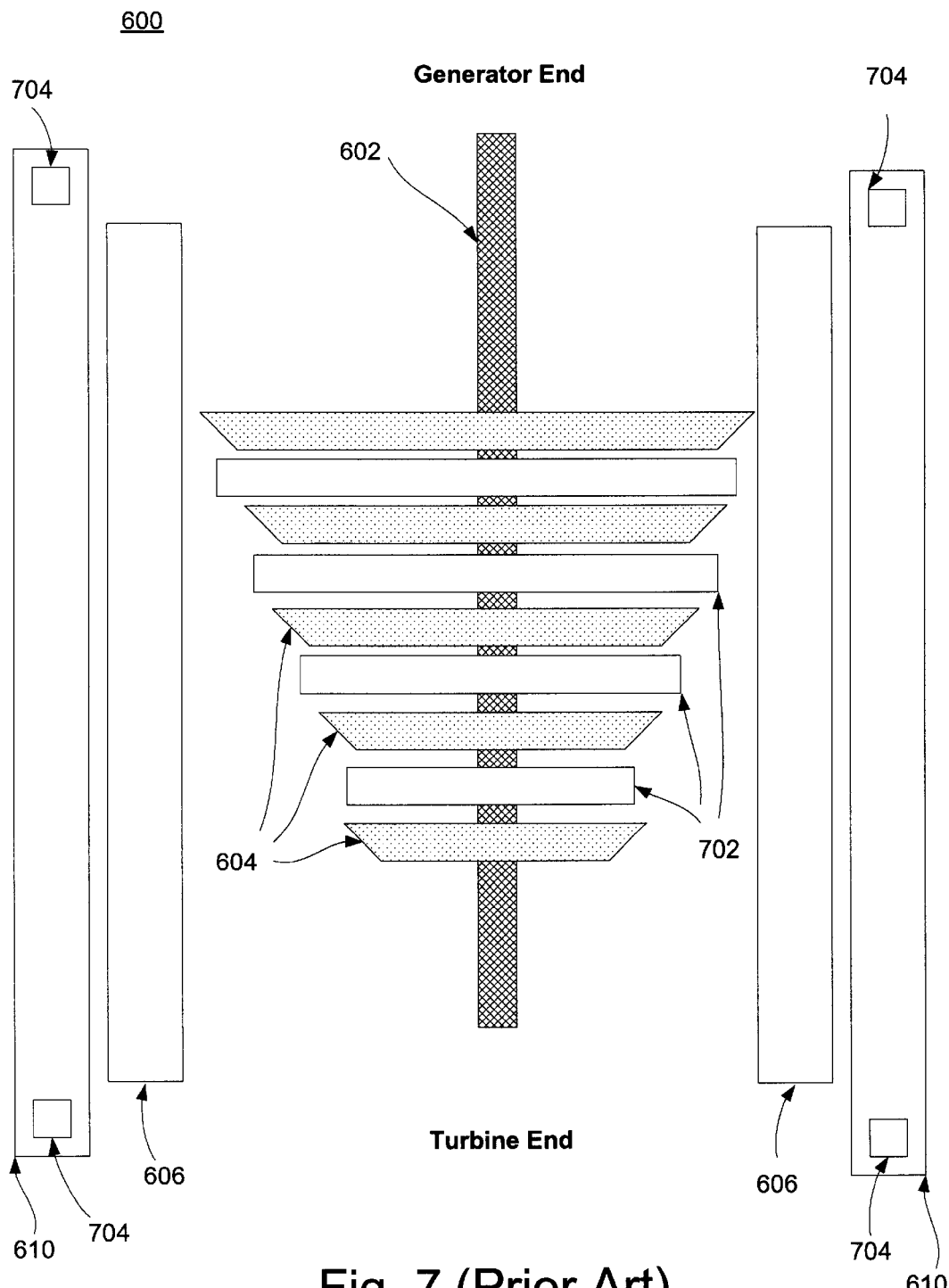
FIG. 7 is an overhead view of the FIG. 6 turbine with the upper casings removed.
Figure 8:
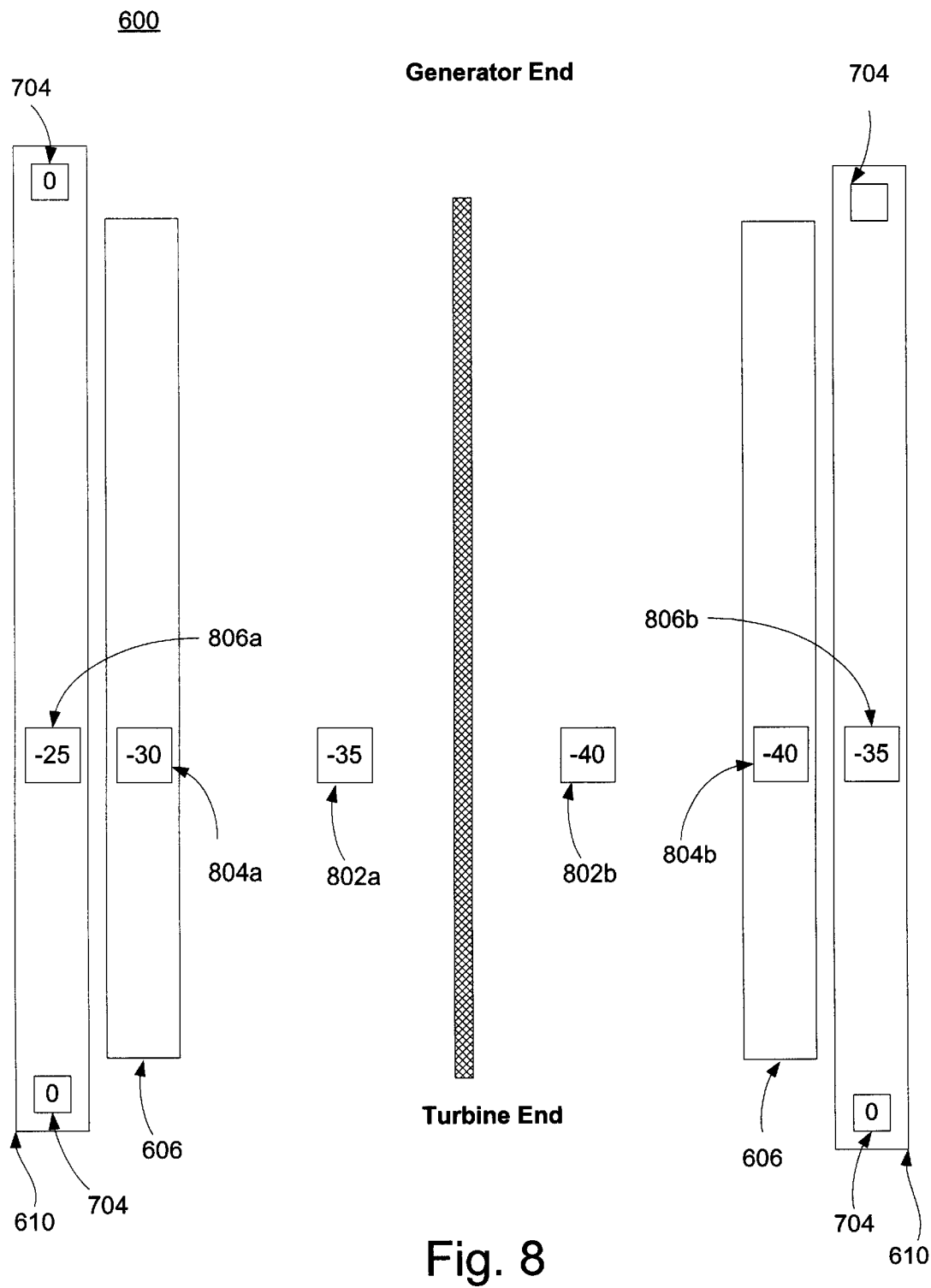
FIG. 8 is a topographical map showing relative elevations of points in the FIG. 7 turbine.

FIG. 7 shows an exemplary overhead view of the turbine 600, which may have one or more diaphragms 702 and outer shell support points 704. FIG. 8 shows an exemplary topographical map of the turbine 600 shown in FIG. 7, and omits for clarity the turbine, wheels and diaphragms. FIG. 8 also shows component support points 802a,b that may be measured using an alternate embodiment of the present invention, which will be described below. While the following description predicts offset values to compensate for tops on displacement of component support points 802a,b, it will be understood that displacement at other points and/or support points may be predicted.

Figure 9:
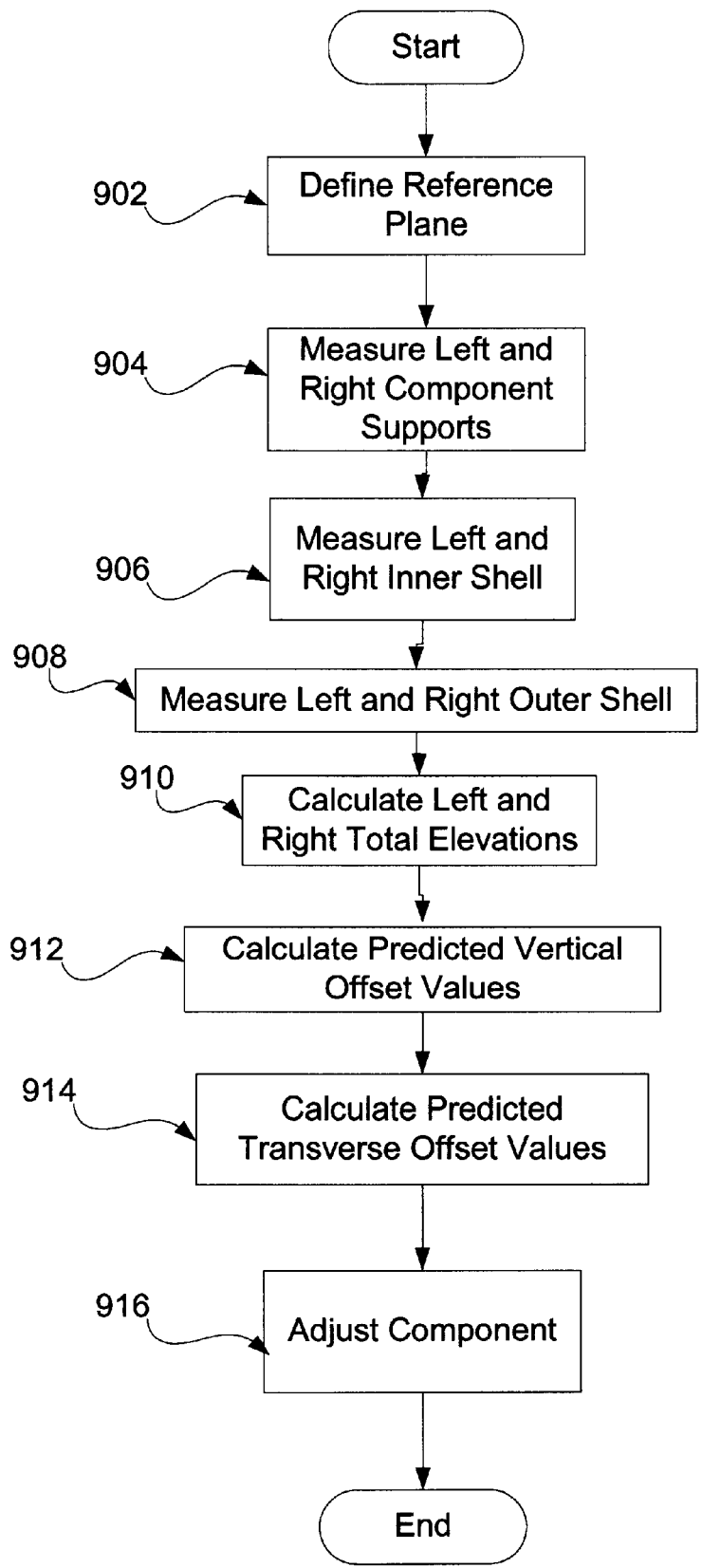
FIG. 9 is a flow diagram depicting steps taken in an exemplary embodiment of the present invention.

FIG. 9 shows an exemplary method for determining prediction offset values for the tops on displacement of support points 802a,b. The steps in FIG. 9 are similar to the steps shown in FIG. 4 and described above, and differ to account for the turbine having inner and outer shells. Initially, at step 902, a reference plane may be defined for measuring vertical displacements of various points of the turbine after upper casings 608, 612 are removed. In preferred exemplary embodiments, the reference plane is defined using three of the outer shell lower support points 704. In the FIG. 8 exemplary map, a reference plane may be defined using the left and right outer shell supports 704 at the turbine end, and the left support 704 at the generator end. The relative elevations at these points are shown as zero (0).

Then, in step 904, the elevations for left and right component supports 802a,b may be measured using any known method. The FIG. 8 exemplary map shows these points having elevations of −35 units and −40 units, respectively. In step 906, elevation measurements are taken at points 804a,b along the inner shell on either side of the component supports 802a,b. These inner shell points 804a,b are preferably located along the same axial location, or in a same axial plane, as the component supports 802a,b, and may be identified by moving transversally away from the shaft axis from the supports 802a,b until the inner shell is encountered. These points may be located along the horizontal joint of the inner shell. The FIG. 8 topographical map shows the elevation at the inner shell points 804a,b to be −30 units and −40 units, respectively.

In step 908, elevation measurements are taken at left and right points 806a,b on the outer shell lower supports. These points 806a,b are also preferably located along the same axial location, or axial plane, as the component supports 802a,b and inner shell points 804a,b. These points may be located along the horizontal joint of the outer shell. In some embodiments, points 804 and/or 806 may be aligned with support points 802a,b. In FIG. 8, these points 806a,b exhibit a vertical elevation of −25 units and −35 units, respectively.

In step 910, left and right total elevations for a particular component, stage, or diaphragm are calculated by summing 1) the relative elevation of the measured outer shell point (e.g., 806a); with 2) the difference in relative elevation between a measured component's support (e.g., 802a) and corresponding inner shell point (e.g., 804a). This total may be calculated in many ways, and in a preferred embodiment, is calculated for each side by adding the outer shell relative elevation measured in step 908 to the component support relative elevation measured in step 904, and then subtracting the inner shell relative elevation measured in step 906. Subtracting the inner shell relative elevation allows the algorithm to discount differences in elevation between the inner shell and outer shell points (e.g., 804a and 806a, respectively), because the two shells are expected to experience the same tops on displacement. Using the FIG. 8 example, the left total elevation would be calculated to be: ((−25)+(−35−(−30))), or −30 units. The right total elevation would be calculated to be: ((−35)+(−40−(−40))), or −35 units.

When the left and right total elevations are calculated, the offsets for the component, stage, or diaphragm being aligned may be calculated. In step 912, the predicted offset value for the vertical tops on displacement may be calculated as one-third of the average between the left and right total elevation values calculated in step 910. In the FIG. 8 example, this value may be calculated as: (⅓)(½)((−30)+(−35)), or −10.8333 units. The component, stage, or diaphragm being measured is thus predicted to need a vertical offset of −10.8333 units (or lowered by 10.8333 units) to compensate for expected tops on vertical displacement. In this example, then, the measured component is expected to rise by 10.8333 units when the tops are placed back on.

In step 914, the offset needed to compensate for the transverse displacement for the measured component, stage, or diaphragm may also be calculated. This transverse offset may be calculated as one-half the absolute difference between the left and right total elevations calculated in step 910. The direction of the transverse offset is in the direction of the lower of the two values. Using the values from FIG. 8, the transverse offset would be calculated as: (½)|((−30)−(−35))|, or 2.5 units. Since the right total elevation value is lower (at −35), the transverse offset is to the right. Thus, the transverse offset for the measured component would be 2.5 units to the right, meaning the measured component is predicted to shift 2.5 units to the left upon replacement of the tops.

In step 916, the offset values calculated in steps 912 and 914 may be used to adjust the measured component to compensate for the tops on displacement, improving their tops on alignment when the tops are replaced. In the FIG. 8 example, the support points 802a and 802b may be lowered by 10.8333 units, and shifted to the right by 2.5 units.

Figure 10:
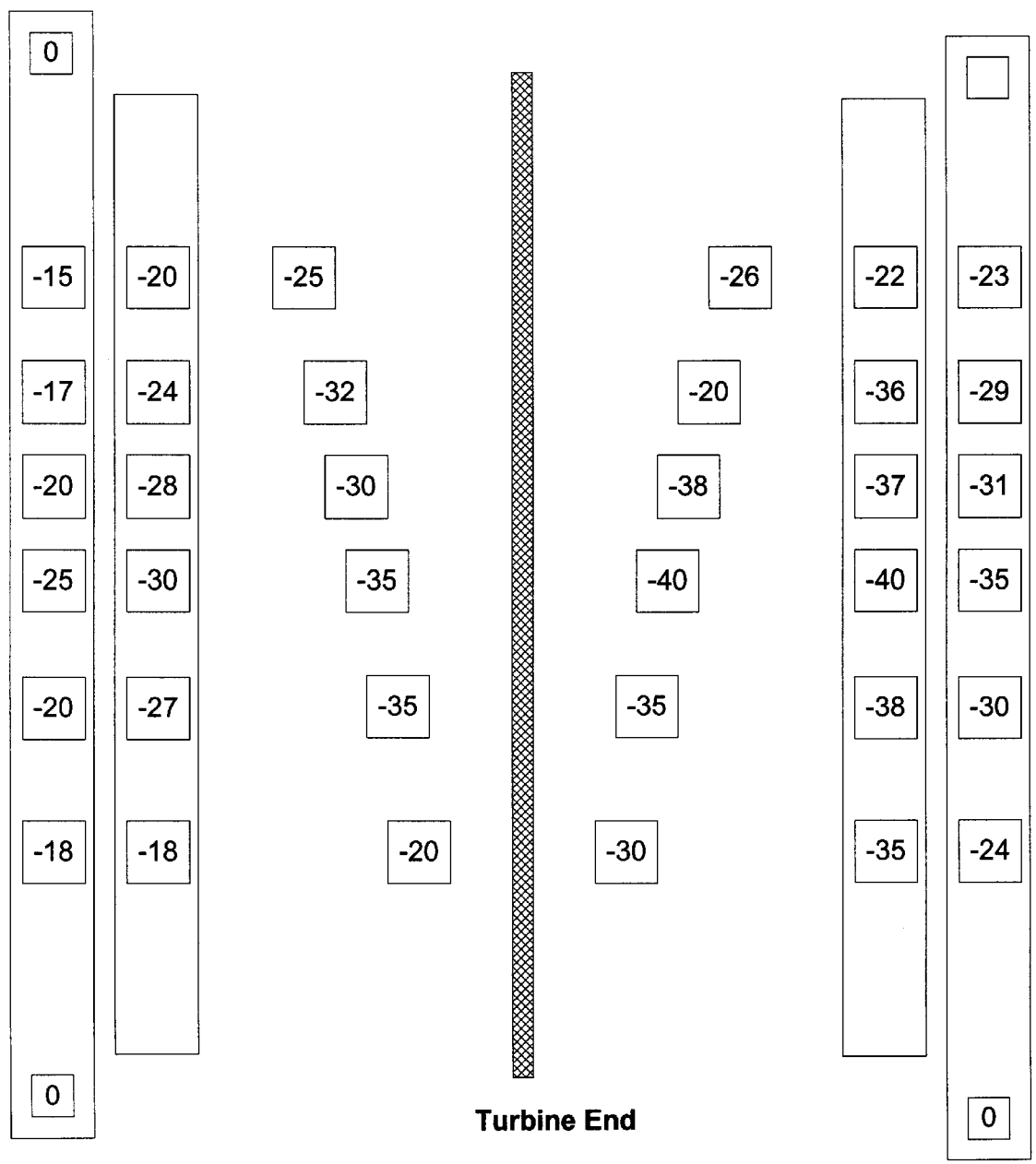
FIG. 10 is an exemplary topographical map showing multiple elevation points of the FIG. 8 map.

In the foregoing descriptions, predicted offset values are calculated to compensate for one or more distortions that may be experienced by a component when the turbine tops are replaced. Although the examples depict measurements for a single component (or stage, diaphragm, etc.), it will be understood that the various steps outline above may be repeated for multiple components and locations around the turbine. For example, FIG. 10 depicts an exemplary topographical map in which numerous measurement points are taken. One or more embodiments of the present invention may then be used to determine predicted offset values for the various components, and many components may be adjusted to compensate for predicted displacements that occur when the turbine upper casing(s) is/are replaced.

Figure 11:
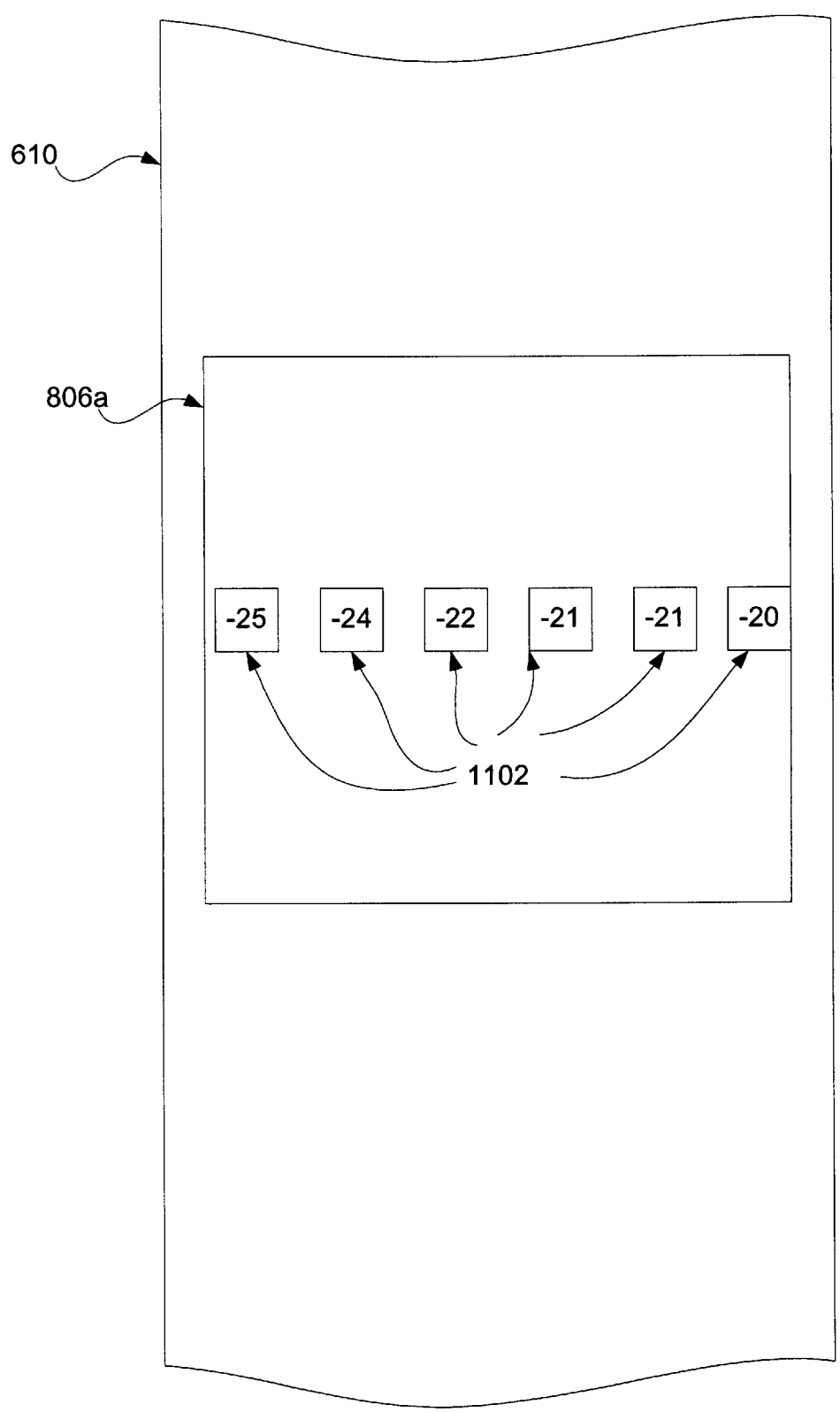
FIG. 11 is a close-up view of a portion of the FIG. 8 map according to a further exemplary embodiment of the present invention.

In a further embodiment, the various measurement points (e.g., inner and/or outer shell measurement points 804, 806) may be identified by measuring multiple points along the shell at the appropriate axial location, and then using the greatest measured deflection in the prediction calculations. For example, point 806a in FIG. 8 is shown to have an elevation of −25 units. In an alternate embodiment, multiple measurements might be taken on the outer shell 610 near point 806a (e.g., at the left/outer edge of outer shell 610 near point 806a, and at the right/inner edge of outer shell 610 near point 806a). If multiple measurements are taken, then the greatest measured deflection is preferably used in a further embodiment of the present invention. Thus, for example, if the outer shell 610, near point 806a, is not perfectly level, multiple measurements may be taken, and the greatest measured deflection may be used. FIG. 11 shows a close-up view of point 806a in FIG. 8, and illustrates an example of this further embodiment, in which multiple measurements 1102 are taken near point 806a along the left side of inner shell 610. The greatest measured deflection in FIG. 11 is −25 units, and this elevation may be used, in a further embodiment, as the elevation for point 806a in the prediction calculations described above.

In a further embodiment, a turbine might include areas in which multiple casings exist (e.g., an inner and an outer), and other areas in which only a single casing exists (e.g., an outer shell). In such turbines, the various steps described above for the single/dual shell turbines may be combined to generate prediction values for various components depending on the particular number of casings at that axial location. For example, a high pressure area of a turbine might be enclosed by both an inner casing and an outer casing, and prediction values for components within such an area may be calculated as described with reference to FIG. 8. The same turbine may also include a low pressure area enclosed by only the outer casing, and prediction values for components within such an area may be calculated as described with reference to FIG. 5.

Although the foregoing description references exemplary embodiments of the present invention, it will be understood that variations of these embodiments are also possible in view of this disclosure without departing from its scope. For example, the present invention may be embodied using various combinations and subcombinations of the features described herein. Although the measurements described above are made using a reference plane as stated, in further embodiments, the various vertical displacements described above may be measured using any alternative form of measurement or any plane.

In further embodiments, the various prediction values calculated above might be further offset by a predetermined amount to account for fluctuations in the predictive model disclosed. Accordingly, further embodiments may include an increase or decrease in the calculated values by 1%, 2%, 5%, 10%, 25%, etc. to modify the results and/or compensate for variances in measuring capabilities. The predictive models may also be adjusted by predetermined factor amounts, such as 1 mil, 0.01 mm, etc. In yet further embodiments, tolerance values may be adjusted to allow variations in the implementation of the various alignments used herein. For example, some or all of the predictive calculations may vary within a tolerance range of plus/minus 0.01%, 0.5%, 1%, 2%, 5%, 10%, etc. The greater the permitted variance, the simpler it may be to perform the alignments.

The various embodiments described above may be implemented on a variety of steam turbine types and/or sections. For example, one or more described embodiments may be applied to LSTG Fossil HP/RHT and LP turbine sections. Steam turbines having Fossil Codes of D5-8-G2-6-S2, nuclear HP M&N Unit Codes, and other types as well.

While the invention has been described with reference to various exemplary preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best modes contemplated for carrying out this invention, but that the invention will include all embodiments falling within the scope of the appended claims.

What is claimed is:

1. A method for aligning a component of a steam turbine, comprising the steps of:
   with an upper casing of said steam turbine removed, determining relative elevations of left and right support points of said component, said relative elevations being relative to an elevation of a support point of a lower casing of said turbine;
   calculating a prediction offset value for said left and right support points of said component based on said relative elevations;
   adjusting said left and right support points of said component by said prediction offset value, wherein an alignment of said component is improved upon replacing said upper casing of said turbine.

2. The method of claim 1, wherein said prediction offset value is a vertical displacement value, and said step of adjusting raises or lowers said left and right support points of said component by said prediction offset value.

3. The method of claim 2, wherein said prediction offset value is equal to one-third of an average of said relative elevations.

4. The method of claim 2, wherein said prediction offset value is within a predefined range from one-third of an average of said relative elevations.

5. The method of claim 4, wherein said predefined range is one percent of a value equal to one-third of an average of said relative elevations.

6. The method of claim 4, wherein said predefined range is five percent of a value equal to one-third of an average of said relative elevations.

7. The method of claim 1, wherein said prediction offset value is a transverse displacement value, and said step of adjusting moves said left and right support points of said component by said prediction offset value in a direction transverse to an axis of said turbine.

8. The method of claim 7, wherein said prediction offset value is equal to one-half of a difference between said relative elevations.

9. The method of claim 7, wherein said prediction offset value is within a predefined range of one-half of a difference between said relative elevations.

10. The method of claim 9, wherein said predefined range is equal to five percent of a value equal to one-half of a difference between said relative elevations.

11. The method of claim 7, wherein said step of adjusting moves said left and right support points of said component to the right if said relative elevation of said right support point is lower than said relative elevation of said left support point, and wherein said step of adjusting moves said left and right support points of said component to the left if said relative elevation of said left support point is lower than said relative elevation of said right support point.

12. The method of claim 1, wherein said prediction offset value includes a vertical offset value and a transverse offset value.

13. A method of aligning a component within a steam turbine, comprising the steps of:
   removing an upper casing of said steam turbine;
   determining elevations of left and right support points of said component, relative to an elevation of a support point of an outer shell of said steam turbine;
   vertically adjusting said left and right support points of said component by one-third of an average of said left and right support points; and
   transversely adjusting said left and right support points of said component by one-half of a difference between said left and right support points; and
   replacing said upper casing of said steam turbine, wherein said component displaces as a result of said step of replacing, and said displacement improves an alignment of said component.

* * * * *